Patented May 9, 1950

2,507,239

UNITED STATES PATENT OFFICE 2,507,239

PROTECTIVE COATING COMPOSITIONS

Lester Aronberg, Chicago, Ill.

No Drawing. Application December 2, 1946,
Serial No. 713,471

13 Claims. (Cl. 106—15)

My invention relates to protective coatings which are resistant to high temperatures. Such coatings are of particular utility for the protection of smokestacks, exhaust pipes on engines, mufflers, covers for annealing boxes and, in short, wherever a surface is subjected to elevated temperatures and where it is desired to protect such surface against rust or oxidation and the burning-out effect of high heat.

While protective coatings of various types heretofore produced have functioned quite satisfactorily at normal temperatures or slightly in excess thereof, at high temperatures as, for example, of the order of 1000 to 1500 degrees F., said coatings have, in general, lost their protective properties. This has been found to be due to one or more factors as, for instance, the thermal breakdown of the protective coating, the formation of pinholes or the like in such coating, and the lack of adhesion of the coating to the surface to which the same is applied.

In accordance with my invention, protective coatings are produced which are simple to apply to the surface to be protected which may, for example, be iron or steel or the like, which possess good adhesion or adherence to such surfaces at normal temperatures and which continue to exhibit good adhesion or adherence at intermediate temperatures as well as at temperatures even as high as about 1500 degrees F. and somewhat higher.

The protective coatings of my invention comprise an organic film-forming material, particularly in the form of a solution thereof in an organic solvent, in admixture with fused lead borate or, as more commonly called, lead metaborate, namely, $Pb(BO_2)_2$, and, most desirably, an inorganic coloring material or pigment. Lead metaborate crystallizes with one molecule of water of crystallization. For the purposes of my present invention, it is important that the water of crystallization be removed from the lead metaborate and, therefore, whenever reference is made herein to lead metaborate, it will be understood to mean that form of lead metaborate which does not contain water of crystallization. The lead metaborate should be in finely divided form and, for best results, it should be of the order of 200 mesh size or even still finer to obtain enhanced covering power for a given weight of material.

The organic film-forming material is preferably one that is volatilized or carbonized relatively slowly under heat and it is utilized in proportions such that it does not leave too much of a carbonaceous layer on the surface to which the protective coating has been applied so that the lead metaborate can anchor itself to said surface even before the melting temperature of the lead metaborate is reached. In this general connection, it may be stated that when the protective coatings of my invention are subjected to elevated temperatures, the organic film-forming materials as well as other organic materials which may be present as, for example, plasticizers, are carbonized and in part volatilized and in part retained on the surface in the form of a carbonized residue. The lead metaborate, which as hereafter pointed out is used in large proportions, however, in some manner or other effectively anchors itself to the iron or steel or other surface and serves as a continuous protective coating at temperatures below as well as above its melting point.

I prefer to incorporate supplemental ingredients as, for example, plasticizers and suspending agents and, in this connection, it may be observed that certain materials, for example, linseed oil, serve this dual purpose.

In order that those skilled in the art may more fully understand the nature of my present invention, the following examples are illustrative of protective coatings falling within the scope of my invention. It will be understood that various changes may be made therein, within the scope of the guiding teachings and principles disclosed herein, as, for example, by the use of different organic film-forming materials, different organic solvents, different pigments, different plasticizers, and varying proportions of ingredients. All parts listed are by weight.

*Example 1*

| | |
|---|---:|
| Ester gum (acid No. 10–7) | 50 |
| Xylol | 80 |
| Lead metaborate | 200 |
| Black iron oxide | 50 |

*Example 2*

| | |
|---|---:|
| Ester gum (acid No. 10–7) | 50 |
| Boiled linseed oil | 10 |
| Xylol | 80 |
| Lead metaborate | 200 |
| Copper bronze | 50 |

*Example 3*

| | |
|---|---:|
| Alkyd resin (ethyleneglycolphthalic anhydride) | 50 |
| Dibutyl phthalate | 2 |
| Ethyleneglycol monoethyl ether | 80 |
| Lead metaborate | 240 |
| Titanium dioxide | 25 |

*Example 4*

| | |
|---|---:|
| Linseed oil | 20 |
| Ethyleneglycol monoethyl ether | 80 |
| Lead metaborate | 150 |
| Black iron oxide | 30 |

The protective coatings of the foregoing examples are satisfactorily prepared by admixing the ingredients in the order listed in each example. Thus, in the case of Example 1, the ester gum is first dissolved in the xylol, and then the fused lead borate and black iron oxide are added, in order, with vigorous agitation. In those compositions in which dispersed or undissolved solids settle out on standing, the protective coating compositions should be shaken before using the same.

A wide choice of organic film-forming materials is available for use for the purposes of my present invention, particularly those types which are commonly used in conventional types of lacquers and varnishes. I prefer to utilize a varnish gum and I have found that ester gum having an acid number of 10-7 is very satisfactory. Other illustrative examples of organic film-forming materials which may be used alone or in compatible mixtures are cellulose esters such as cellulose nitrate, cellulose acetate, cellulose propionate, cellulose butyrate and the like; resinous alkylene polymers such as those derived from ethylene, propylene, butylene and the like; cellulose ethers such as ethyl cellulose, propyl cellulose, butyl cellulose and the like; linseed oil; mastic; dammar; Glyptal and alkyd meltable resins; urea resins, vinyl resins, acrylic resins, and other synthetic resins and plastic materials. I may also employ organic materials such as ethyl silicate which are converted to a film as, for example, by hydrolysis through moisture present in the air, although the ultimate film in this instance is of inorganic character. Since the initial material applied to the surface is organic in nature, I consider such materials to be organic film-forming materials despite the character of the ultimate film which may be formed.

Where plasticizers are employed in order to decrease or overcome the brittleness of the protective coating film at the lower temperature ranges, such plasticizers may be selected from a large group which are commonly used in the varnish and lacquer industries. Typical examples of such plasticizers are dibutyl phthalate, tricresyl phosphate, castor oil, hydrogenated methyl abietate, mineral oil, and linseed oil.

The protective coating compositions are most desirably prepared and used in the form of liquids and, in this form, they are readily applied by means of a brush or in any other suitable manner. The liquid medium is supplied in the main by the employment of organic solvents for the organic film-forming materials and, in this connection, the solvents or solvent mixtures selected will depend upon the particular organic film-forming materials used in any specific protective coating composition. Where ester gum is utilized as the film-forming material, xylol is very satisfactory as a solvent and liquid medium. The protective coating compositions may be used in the form of dry admixtures, without any organic solvent, or the ingredients may be compounded together by dry mixing or by a melting procedure, and in such form the compositions can be melted onto the surface to be protected. In such case, of course, the organic film-forming material must be one which is meltable. For example, pulverulent compositions may be prepared comprising lead metaborate, pigment and a resinous ethylene polymer and such composition applied to the surface to be protected by spraying the composition through an oxy-acetylene flame or the like.

Suspending or dispersing agents may, if desired, be utilized in order to assist in maintaining the undissolved solids in suspension in the liquid protective coating compositions, typical examples of suitable suspending agents being bentonite, metallic soaps such as aluminum stearate, zinc stearate and the like. Such agents, where utilized, are employed in relatively small proportions.

The coloring material or pigments employed, which are most desirably of inorganic character in order to eliminate destruction at elevated temperatures, may be selected from a large group, typical examples of which are black iron oxide, copper bronze, chromium oxides, titanium dioxide, cobalt oxide, and cadmium sulfide.

The proportions of ingredients are subject to variation within wide limits but, in all cases, the lead metaborate is present in amounts exceeding the amount of the organic film-forming material, and, particularly, the amount of the lead metaborate is in excess of twice that of the organic film-forming material. Indeed, where the protective coating compositions contain inorganic pigments or coloring materials and plasticizers, I find it highly advantageous to use amounts of lead metaborate largely exceeding and, most desirably, in excess of twice the amount of the combined amounts of organic film-forming material and inorganic pigment or organic film-forming material and plasticizer. The relative amounts of lead metaborate and organic film-forming material should, moreover, be such that the finished protective coating composition spreads easily, as by means of a brush or the like, over the surface to which the composition is to be applied. Satisfactory compositions may be prepared wherein the ingredients are present in approximately the following proportions by weight:

| | |
|---|---|
| Organic film-forming material | 35-60 |
| Organic solvent | 60-90 |
| Lead metaborate | 150-270 |

Where pigments or coloring materials and plasticizers are utililzed, satisfactory compositions may be represented by the following:

| | |
|---|---|
| Organic film-forming material | 35-60 |
| Organic solvent | 60-90 |
| Lead metaborate | 150-270 |
| Pigment | 25-75 |
| Plasticizer | 2-15 |

While I prefer that my protective coating compositions be compounded in the manner described above, using already prepared lead metaborate, it will be understood that it is within the scope of my invention to prepare protective coating compositions in which the lead metaborate is produced in situ. Thus, for example, the ester gum or the like may be melted and admixed with lead carbonate and boric acid in the requisite proportions to form the desired amount of lead metaborate and the mixture heated to complete the formation of the lead metaborate.

While my invention has been described in detail, the scope thereof is not to be limited except as is set out in the appended claims.

What I claim as new and desire to protect by Letters Patent of the United States is:

1. A protective coating composition, having good surface adherence characteristics and being resistant to elevated temperatures, comprising, in admixture, an organic film-forming material and anhydrous lead metaborate, the amount of lead metaborate exceeding that of the organic film-forming material the said relatively high proportion of lead metaborate functioning to form in itself substantially a continuous bond and pro- Patented Feb. 6, 1951

2,540,239

UNITED STATES PATENT OFFICE 2,540,239

INSECTICIDAL PAINT

Garfield Arthur Bowden, East Orange, N. J., and Carl Iddings, Manhasset, N. Y., assignors to Boyle-Midway Inc., New York, N. Y., a corporation of Delaware No Drawing. Application February 5, 1945, Serial No. 576,370

9 Claims. (Cl. 106—15)

This invention relates to an insecticidal coating composition and particularly relates to an oil type of paint or varnish containing small amounts of 2,2-bis(p-chlorophenyl)1,1,1-trichloroethane, referred to hereinafter as DDT.

One object of the present invention is to provide a coating composition, which upon application to a suitable surface, is capable of drying to give a coated surface that manifests a high degree of insecticidal activity against flies and many other insect pests over a period of many months.

Another object of the invention is to provide a means of substantially abolishing the prevalence of flies and other insect pests in human habitations and stores, and thereby diminish the spread of diseases.

A specific object of the invention is to provide an oil type paint or oil varnish containing DDT.

According to our invention, a small amount of DDT is incorporated into an oil type paint or varnish in the presence of preferably about 10 to about 40% by weight of a volatile organic solvent for the DDT, which solvent has such a volatility that the initially dry oil film retains some of the solvent residually. The volatile organic solvent, carrying a portion of the added DDT, apparently migrates to the surface as the paint dries. On the other hand the oil upon oxidation forms a film that is permeable to the organic solvent and that acts to trap at or upon its surface the crystallizing DDT which is deposited as the concentration of the DDT increases by virtue of the volatilization of the solvent. Regardless of the explanation, the fact remains that after drying and standing for some time, the paint compositions of this invention yield surfaces upon which can be seen numerous crystals of DDT upon examination under a microscope even at low magnification.

The following example illustrates how the invention may be carried out in practice, but it is to be understood that the invention is in no way limited thereby to the details given therein.

*Example*

Five parts by weight of DDT were mixed until uniformly distributed with 95 parts by weight of an exterior oil paint formula consisting of 63% pigment and 37% vehicle, by weight. The pigment portion consisted of

| | Parts by weight |
|---|---|
| Titanium dioxide | 2.7 |
| Zinc sulfide | 34.2 |
| Lithopone | 11 |
| Barium sulfate | 34.1 |
| Magnesium silicate | 18.0 |
| | 100 | while the vehicle portion consisted of

| | Parts by weight |
|---|---|
| Resin | 8.5 |
| Linseed oil | 25.5 |
| Drier (cobalt oleate) | 2 |
| Mineral spirits | 62 |
| Water | 2 |
| | 100 |

The mineral spirits was a conventional petroleum distillate product having specific gravity at 60° F. of .7735 to .7821, and having an initial boiling point of 300° F. and an end boiling point of 400° F. The water in this case is added as a thickening agent to give the paint better thixotropic properties.

The resulting uniformly white paint was applied evenly with a brush on a panel board of dimensions 6" x 6", and dried by exposure to the air during the period of about eighteen hours. The completely dry to the touch panel board but containing residual solvent was placed under a circular glass bell jar about 7" in diameter and about 5" high, and containing thirty-five flies. Except for some flying around in the jar, the flies remained for the most part in contact with the painted panel board. After exposure for several hours to the painted panel board, the flies still appeared to be unaffected. Under the microscope no crystals of DDT could be perceived upon the surface of the coating.

After five weeks, the painted panel boards, which were now substantially completely free from residual solvent, were again placed in the bell jar with about thirty-five flies. This time, all the flies were in a "knockdown" condition after one hour and twenty minutes exposure, and at the end of three and one-half hours, all of the thirty-five flies were dead. Upon examination of the painted panel under a microscope about 50% or more of the surface of the painted panel was covered with numerous long crystals and feathery crystals of DDT, and this undoubtedly explains the efficacy of the painted surface in destroying flies. The panel had not been inspected during the interim period of five weeks. A new panel was therefore painted and observed more closely. At the end of thirty-eight hours crystals of DDT could be observed forming below the surface of the coating. At the end of forty-eight hours a few feathery crystals of DDT could be seen at and on the surface of the coating. At the end of seventy-two hours, some dull long crystals appeared while the feathery crystals of DDT increased to the extent that about 50% or more of the surface was covered with DDT crystals.

The first painted panel board was examined again at the end of four months for insecticidal activity and again, all the flies were "knockdown" in our hour and twenty minutes and were all dead within three and one-half hours. Under the microscope, numerous crystals of DDT were still evident at and on the surface of the paint coating and this undoubtedly explains the efficacy of the painted surface in destroying flies. While it is preferred that the paint compositions of this invention contain about 5 to 10% of DDT by weight, still smaller quantities such as about 1 to 3% of DDT provides a paint which is still quite effective in destroying flies and other insect pests.

The paint compositions containing the DDT may take the form of various oil type compositions. For instance, a suitable inside paint formula is as follows:

| | Parts by weight |
|---|---|
| Dry titanium dioxide pigment | 565 |
| Raw linseed oil | 271 |
| Damar varnish | 78 |
| Petroleum spirits, boiling point 194° to 248° F | 194 |
| Ultramarine blue in oil | .5 |
| Paint drier | 36 |
| DDT | 57 |

A suitable inside flat paint formula is

| | Parts by weight |
|---|---|
| Dry zinc oxide | 1287 |
| Raw linseed oil | 281 |
| Petroleum spirits, boiling point 194° to 248° F | 231 |
| Ultramarine blue in oil | .5 |
| Paint drier | 44 |
| DDT | 92 |

A suitable formula for white enamel paint is

| | Pounds |
|---|---|
| Modified pentaerythritol ester of rosin | 100 |
| Castor oil | 120 |
| Raw linseed oil | 38.8 |
| Mineral spirits | 204.8 |
| Drier—1 lb. lead in the form of lead resinate plus .1 lb. cobalt in the form of cobalt resinate. | |
| DDT | 23.2 |

The modified pentaerythritol ester of rosin which is a reaction product of pentaerythritol and a rosin acid such as abietic acid prepared as disclosed in U. S. Patent No. 1,820,265, castor oil and raw linseed oil are cooked together a short time, and then the mineral spirits containing the dissolved DDT is added to thin the vehicle. To ⅘ gal. of this vehicle is added 5 lbs. of a rutile titanium dioxide containing some calcium sulfate as an extender, and after grinding in the usual way to secure even distribution of the pigment, the driers are added.

Most any suitable oil of the unsaturated type may be used in place of the linseed oil provided they oxidize upon exposure to air to form an organic solvent permeable film upon which the DDT is retained as it crystallizes out from the volatile organic solvent which has permeated through the film. For example, tung oil, perilla oil, soy bean oil, oiticica and fish among the naturally occurring oils either refined or raw, may be used singly or in combination. Likewise, dehydrated oils such as dehydrated castor oil also serve to achieve the desired result. However, we prefer especially those oils having 1:4 conjugated double bonds in their chemical structure and having an iodine number of 160 to 200.

Instead of mineral spirits of the example, there may be substatuted most any volatile organic solvent for DDT so long as the volatility of the solvent is such in conjunction with the permeability of the film forming substance that deposition of DDT occurs at and upon the surface of the dried coating. Among such liquids may be mentioned turpentine, pine oil, naphthas particularly painter's naphtha having an initial boiling point of 190° F. and an end boiling point of 310° F. and a specific gravity of .8383; petroleum lacquer diluent having a specific gravity of .7349 to .7419 having an initial boiling point of 200° F. and an end boiling point of 270° F.; petroleum lighter lacquer diluent having a specific gravity of .6948 and an initial boiling point of 140° F. and an end boiling point of 200° F., benzol, xylol, butyl alcohol, amyl acetate, butyl acetate, diethyl ketone, and chlorinated hydrocarbons, such as tetrachloroethane. Such liquids are quite volatile and evaporate largely from the film coating during the initial drying period leaving a residual amount of solvent that is gradually evaporated over a period of days.

A preferred procedure in preparing the DDT coating compositions of this invention is to dissolve the DDT in the volatile organic solvent preferably mineral spirits and then stir the solution with the previously prepared oil paint or oil varnish until uniformly distributed.

However, one may also add the solid DDT to the previously prepared oil coating composition containing about 15 to 40% by weight of the aliphatic organic solvent for DDT such as mineral spirits and stir the mixture until the DDT has been uniformly incorporated.

Various transparent oil varnishes, which are in effect substantially the same type of compositions as the above described oil paints, except pigments are omitted, may also be mixed with about 1 to about 10% by weight of DDT to provide varnishes which are toxic by contact to flies and many other insect pests. Suitable formulae for this purpose are

*Spar varnish type*

| | Pounds |
|---|---|
| Modified phenol-formaldehyde resin | 100 |
| Dehydrated castor oil | 161 |
| Raw linseed oil | 116.4 |
| Mineral spirits | 301 |
| Drier—2.8 lbs. lead in the form of lead resinate plus .3 lb. manganese in the form of manganese resinate. | |
| DDT | 34 |

The modified phenol-formaldehyde resin which is prepared in accordance with the disclosure of U. S. Patent No. 1,736,757 was mixed uniformly with the dehydrated castor oil and the raw linseed oil, after which the mineral spirits containing the dissolved DDT was incorporated. Finally, the drier was added.

*Floor varnish type*

| | Pounds |
|---|---|
| Modified phenol-formaldehyde resin | 100 |
| Oiticica oil | 81 |
| Castor oil | 80 |
| Mineral spirits | 205 |
| Drier—1.9 lbs. lead in the form of lead resinate plus .2 lb. manganese in the form of manganese resinate. | |
| DDT | 23.5 |

The modified phenol-formaldehyde resin was mixed thoroughly with the oiticica oil and the castor oil, after which the mineral spirits con-